United States Patent
Aoshima et al.

(10) Patent No.: US 6,721,147 B2
(45) Date of Patent: Apr. 13, 2004

(54) LONGITUDINALLY BIASED MAGNETORESISTANCE EFFECT MAGNETIC HEAD AND MAGNETIC REPRODUCING APPARATUS

(75) Inventors: Kenichi Aoshima, Palo Alto, CA (US); Kenji Noma, Atsugi (JP); Junichi Ito, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 09/826,053

(22) Filed: Apr. 4, 2001

(65) Prior Publication Data
US 2001/0014001 A1 Aug. 16, 2001

Related U.S. Application Data

(63) Continuation-in-part of application No. 09/594,115, filed on Jun. 14, 2000, now Pat. No. 6,556,391.

(30) Foreign Application Priority Data

Dec. 7, 1999 (JP) ............................................. 11-348149
Aug. 16, 2000 (JP) ......................................... 2000-247058

(51) Int. Cl.⁷ ................................................. G11B 5/39
(52) U.S. Cl. ................................. 360/324.12; 360/324.2
(58) Field of Search ................................. 360/317, 319, 360/320, 324.1, 324.11, 324.12, 324.2, 327.3, 327.31, 327.32, 126

(56) References Cited

U.S. PATENT DOCUMENTS

| | | | |
|---|---|---|---|
| 5,739,987 A | 4/1998 | Yuan et al. ............ | 360/327.32 |
| 5,898,548 A | 4/1999 | Dill et al. ................ | 360/324.2 |
| 5,901,018 A | 5/1999 | Fontana, Jr. et al. ..... | 360/324.2 |
| 6,157,526 A | 12/2000 | Watanabe et al. ....... | 360/324.12 |
| 6,185,080 B1 | 2/2001 | Gill ......................... | 360/324.2 |
| 6,210,810 B1 | 4/2001 | Ikarashi et al. ............. | 428/611 |
| 6,266,218 B1 | 7/2001 | Carey et al. ............ | 360/324.12 |
| 6,295,186 B1 | 9/2001 | Hasegawa et al. ..... | 360/324.11 |
| 6,327,107 B1 | 12/2001 | Komuro et al. ................ | 360/55 |
| 6,333,842 B1 | 12/2001 | Nobuyuki et al. ....... | 360/324.2 |
| 6,381,107 B1 | 4/2002 | Redon et al. ............. | 360/324.2 |
| 6,421,212 B1 * | 7/2002 | Gibbons et al. ........ | 360/327.31 |
| 6,445,554 B1 * | 9/2002 | Dong et al. ............. | 360/324.2 |
| 6,452,762 B1 * | 9/2002 | Hayashi et al. .......... | 360/324.1 |
| 6,483,675 B1 * | 11/2002 | Araki et al. ............ | 360/324.2 |
| 2002/0006020 A1 | 1/2002 | Hasegawa ................ | 360/324.2 |

FOREIGN PATENT DOCUMENTS

JP 07176020 7/1995
JP 09091629 4/1997

* cited by examiner

Primary Examiner—Jefferson Evans
(74) Attorney, Agent, or Firm—Greer, Burns & Crain, Ltd.

(57) ABSTRACT

A magnetoresistance effect magnetic head includes a magnetoresistance effect element having first and second ends. An electrically insulating biasing portion is at ends of the magnetoresistance effect element to apply a longitudinal bias magnetic field to the magnetoresistance effect element and to suppress leakage current at the ends of the magnetoresistance element. The biasing portion can include an intermediate longitudinal bias application layer disposed between a first insulating antiferromagnetic layer and a second layer that can be an antiferromagnetic layer. The bias portion can also be formed as one bias application layer.

39 Claims, 5 Drawing Sheets

LONGITUDINALLY BIASED MAGNETORESISTANCE EFFECT MAGNETIC HEAD AND MAGNETIC REPRODUCING APPARATUS

This is a continuation-in-part of Ser. No. 09/594,115, filed Jun. 14, 2000, now U.S. Pat. No. 6,556,391.

BACKGROUND OF THE INVENTION

The present invention relates to a magnetoresistance effect magnetic head that uses a magnetoresistance effect element. More particularly, the invention relates to a magnetoresistance effect magnetic head in which a sense current flows in a direction perpendicular to the surface of the magnetoresistance effect element and accurately reproduces the signal magnetic field from a magnetic recording medium.

FIG. 1 shows a well-known magnetoresistance effect magnetic head 100 (hereinafter called the magnetic head). The magnetic head 100 is shown in cross-section as viewed from a magnetic recording medium (not shown). A magnetoresistance effect element 101 for sensing a signal magnetic field from the magnetic recording medium, such as a hard disk, is shown in the center portion of the magnetic head 100 in FIG. 1. A well-known magnetoresistance effect (MR) element 101 is a spin valve magnetoresistance effect (SVMR) element. This spin valve magnetoresistance effect element 101 is typically formed from multiple deposited thin-film layers including a first magnetic layer, a nonmagnetic layer, a second magnetic layer, and an antiferromagnetic layer (not shown).

The magnetoresistance effect element 101 has ends 101A, 101B connected to electrically conductive lead terminals 102A, 102B. The magnetoresistance effect element 101, the lead terminals 102A, 102B, and hard films 103A, 103B are electrically insulated on both upper and lower sides by an electrically insulating upper gap material 104 and a lower gap material 105. A top 104A of the upper gap material 104 and a bottom 105A of the lower gap material 105 are shielded by respective soft magnetic shields 106, 107.

Recently, there has been considerable demand for higher density recording in magnetic recording/reproducing equipment. To increase the sensitivity of the magnetic head 100 to detect information (signal magnetic field) magnetically recorded at high densities, the width of the gap W1 between the shields 106, 107 was narrowed and the film thickness of the entire magnetic head 100 was thinned. However, the gap materials 104, 105 must maintain a minimum film thickness to maintain insulating characteristics, and forming thinner gap materials 104, 105 is difficult and costly.

Referring to FIG. 2, a known magnetic head 200 further narrows a gap width W2 without narrowing the gap material, as disclosed in unexamined Patent Publication (Kokai) No H 9-28807. In the magnetic head 200, also viewed from a magnetic recording medium (not shown), a magnetoresistance effect element 201 is electrically connected to an upper shield 206 and a lower shield 207 that also function as lead terminals. This configuration eliminates the need for a gap material 204 between the shield 206 and electrically insulating film 202A, and between the shield 206 and electrically insulating film 202B, and also eliminates the need for gap material 205 between the shield 207 and hard film 209A, and between the shield 207 and hard film 209B, to thereby further narrow the gap width W2. This enables a narrower gap to be fabricated.

The upper and lower gap materials 204, 205, placed above and below a magnetoresistance effect element 201, are formed from electrically conductive materials. The electrically insulating films 202A, 202B are provided on ends 201A, 201B of the magnetoresistance effect element 201.

Referring to FIGS. 1–2, the flow direction of a sense current for magnetic head 100 is different from the flow direction of a sense current for magnetic head 200. In the magnetic head 100, a sense current flows from the lead terminal 102A through the magnetoresistance effect element 101 to the lead terminal 102B (or in the reverse direction) in a direction parallel to a generally planar surface 108 of element 101 (only shown in cross-section) hereinafter "planar direction". In the magnetic head 200, a sense current flows from the upper shield 206 through the magnetoresistance effect element 201 to the lower shield 207 (or in the reverse direction) in a direction perpendicular to a surface 208 of the element 201, hereinafter "perpendicular direction". The magnetic head 100, in which a sense current flows in the planar direction, is called a CIP (current in plane) magnetic head. The magnetic head 200, in which a sense current flows in the perpendicular direction, is called a CPP (current perpendicular to plane) magnetic head.

Since a sense current in the CIP magnetic head 100 described above flows in the plane of the MR element, this head cannot use an MR element, for example, that requires a sense current to flow in a direction perpendicular to the plane of the MR element, as in a tunnel magnetoresistance effect (TMR) element. In contrast, magnetic heads using CPP are expected to become popular because of the ability to use a TMR element and to narrow the gap W2 as described above. However, the magnetic head 200 leaks current at both ends 201A, 201B of the magnetoresistance effect element 201, and therefore has difficulty in producing an efficient flow in the perpendicular direction.

To control the magnetic domain of the magnetoresistance effect element 201, it has been proposed that hard films 209A, 209B be formed on both ends 201A, 201B of the magnetoresistance effect element 201 for applying a longitudinal bias magnetic field. In this case, however, if the hard films 209A, 209B are electrically conductive materials such as CoPt or CoCrPt, electrical shorts develop with the upper gap material 204, the current usage rate decreases markedly, and adequate magnetoresistance effect cannot be obtained, which in turn lowers manufacturing yield.

To prevent shorts and current leakage, it has also been proposed that an electrically insulating film, such as alumina, be inserted between the ends 201A, 201B of the magnetoresistance effect element 201 and the hard films 209A, 209B, but even with the use of alumina it is difficult to maintain sufficient electrical insulation. Also, since the magnetoresistance effect element is then magnetically separated from the hard film by the alumina, the longitudinal bias magnetic field applied to the magnetoresistance effect element decays, giving rise to problems of unsatisfactory magnetic domain control and noise generation.

Thus, a main object of the present invention is to provide an improved magnetoresistance effect magnetic head that does not have substantial leakage of current at the ends of the magnetoresistance effect element.

Another object of the present invention is to provide an improved magnetoresistance effect magnetic head capable of applying a sufficiently stable longitudinal bias magnetic field to the magnetoresistance effect element.

Yet another object of the present invention is to provide an improved magnetic recording/reproducing apparatus with the improved magnetic head.

SUMMARY OF THE INVENTION

In accordance with the present invention, a magnetoresistance effect magnetic head has an insulating antiferromagnetic layer placed next to ends of a magnetoresistance element to suppress leakage currents at the ends of the magnetoresistance effect element. A magnetic layer is placed in contact with the antiferromagnetic layer, so that exchange coupling generates a unidirectional anisotropic magnetic field that is applied as a stable longitudinal bias magnetic field to the magnetoresistance effect element. In this manner, a signal magnetic field from a recording medium can efficiently be detected using the magnetoresistance effect without encountering problems such as Barkhausen noise, and an efficient flow of a sense current occurs through the magnetoresistance effect element.

In one aspect of the present invention, a magnetoresistance effect magnetic head has a biasing portion at ends of a magnetoresistance effect element for applying a longitudinal bias magnetic field to the magnetoresistance effect element. The biasing portion includes an antiferromagnetic layer and a magnetic layer in exchange coupling with the antiferromagnetic layer.

In another aspect of the present invention, a single antiferromagnetic layer can be provided above and below the magnetic layer to form a sandwich structure. Because the magnetic layer is sandwiched from above and below by the insulating antiferromagnetic layers, a unidirectional anisotropic magnetic field, stronger than the magnetic layer, can be provided while also providing better insulation.

The foregoing and other objects, advantages and features of the invention will become apparent upon a consideration of the following detailed description, when taken in conjunction with the accompanying drawings.

DETAILED DESCRIPTION

Figure 3:
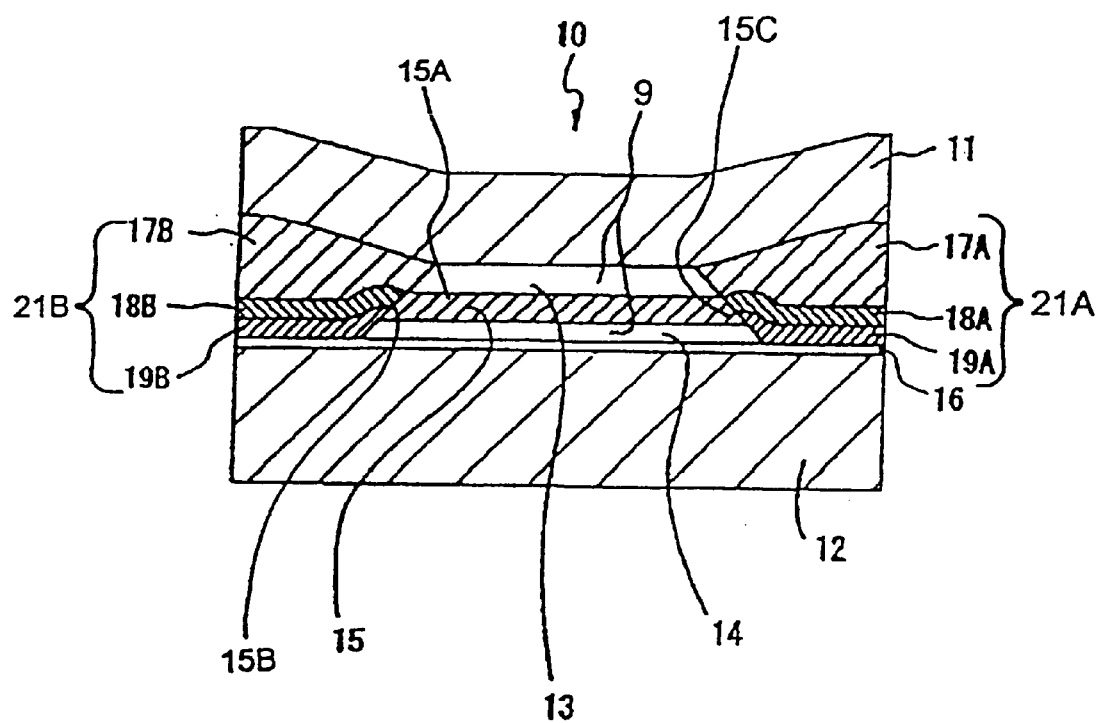
FIG. 3 is a cross-sectional view of a magnetoresistance effect magnetic head in accordance with a first embodiment of the present invention, as viewed from a magnetic recording medium.

Referring to FIG. 3, a first embodiment of CPP magnetic head 10 has an MR element 15. The magnetic head 10 is shown as viewed from an external magnetic recording medium, and the width of the MR element 15 extends in the horizontal direction (as viewed in the drawing) in the same general direction as the width of the tracks of a magnetic recording medium placed under the head 10. A longitudinal plane of the MR element 15 is defined by a surface 15A of the MR element.

In FIG. 3, the magnetic head 10 has an upper magnetic shield 11 and a lower magnetic shield 12. These two magnetic shields 11, 12 are fabricated from a soft magnetic material, such as FeZrN, with a film thickness around 1 to 2 mm. These shields 11, 12 are electrically conductive and also function as lead terminals.

A gap 9 is formed between the magnetic shields 11, 12. The MR element 15 is located in the gap 9 and is electrically connected to the upper shield 11 and the lower shield 12 through electrically conductive upper gap material 13 and lower gap material 14, respectively. Thus, a sense current (not shown) flows from the upper shield 11 (or the lower shield 12) through the upper gap material 13 (or lower gap material 14) into the MR element 15, and then flows perpendicular to the plane of the surface 15A through the lower gap material 14 (or upper gap material 13) to the lower shield 12 (or upper shield 11).

The MR element 15 can be a TMR element or an SVMR element. The TMR element can be a laminated film composed of $Al_2O_3$ as an electrically insulating layer on the bottom, followed by deposited layers of PdPtMn(20)/Co(2)/ $Al_2O_3$(5)/Co(1)/NiFe(2), where the numbers enclosed by parentheses indicate the thickness of each layer in nanometers (nm). The SVMR element can be a laminated film composed of Cu as a nonmagnetic layer on the bottom, followed by the deposited layers of NiFe(2)/CoFeB(4)/Cu (3)/CoFeB(2.2)/PdPtMn(25). The TMR element and SVMR element can also be laminated films with the layers deposited in an order reverse to that described.

Electrically conductive copper, gold, silver, platinum, or an alloy composed of these elements can be used for the upper gap material 13. Preferably, the upper gap material 13 is formed from copper with a film thickness about 20 nm. This also applies to the lower gap material 14, for which a 20 nm thick copper film can be used. To form the preferred film formation, however, about 5 nm of tantalum (Ta) film 16 is formed as an underlayer of the lower gap material 14. Each layer described above can be formed as sequentially deposited layers using conventional thin film fabrication techniques.

Referring still to FIG. 3, bias portions or bias application layers 21A, 21B are provided on ends 15B, 15C of the MR element 15. Electrically insulating antiferromagnetic layers 17A, 17B are placed above respective magnetic layers 18A, 18B and electrically insulating layers 19A, 19B are placed below respective magnetic layers 18A, 18B, with left-right symmetry being provided at both ends 15B, 15C of the MR element 15.

The antiferromagnetic layers 17A, 17B, the magnetic layers 18A, 18B and the electrically insulating layers 19A, 19B become respective bias application layers 21A, 21B. The insulating antiferromagnetic layers 17A, 17B can, for example, be NiO formed to a layer 30 nm thick, and the soft magnetic material magnetic layers 18A, 18B can be nickel-zinc-ferrite formed to a layer 20 nm thick. Alternatively, the magnetic layers 18A, 18B can be metal-oxide hard magnetic films selected from cobalt-ferrite ($CoFe_2O_4$), barium ferrite (BaO $6Fe_2O_3$), cobalt-platinum-silicon oxide (CoPt-$SiO_2$) and ferrite metal(MO $Fe_2O_3$), where MO indicates a metal oxide and M is any metal such as Mn, Ni, Fe, Cu, (LiFe), or Ti.

The magnetic layers 18A, 18B are placed in contact with the antiferromagnetic layers 17A, 17B and with both ends 15B, 15C of the MR element 15. By shifting a B-H loop by exchange coupling with the antiferromagnetic layers 17A, 17B, the magnetic layers 18A, 18B have their directions of magnetization fixed. As a result, because unidirectional anisotropic magnetic fields are generated in the magnetic layers 18A, 18B, a stable longitudinal bias magnetic field can be applied from the magnetic layers 18A, 18B to the MR element 15.

The insulating layers 19A, 19B will have excellent insulation properties if formed from material such as alumina ($Al_2O_3$) to a 30 nm thickness. The electrically insulating layers 19A, 19B can also be an electrically insulating antiferromagnetic material, for example, 30 nm thick NiO. The bias application layers 21A, 21B form a sandwich structure, including a magnetic layer between two antiferromagnetic layers (NiO/nickel-zinc-ferrite/NiO), on both ends 15B, 15C of the MR element 15. With this structure the biasing portions become powerful insulators and the longitudinal bias magnetic field from the magnetic layers 18A, 18B is very stable.

A magnetic head having the structure of the magnetic head 10 is very sensitive in sensing changes in the magnetoresistance of the MR element 15, or in sensing changes in the signal magnetic field from the magnetic recording medium, if the voltage across the MR element 15 is monitored while a sense current flows perpendicular to the surface 15A of the MR element 15.

Because the magnetic domain of the free magnetic layer in the MR element 15 is controlled to a preferred state by a longitudinal bias magnetic field applied to the MR element 15 from the magnetic layers 18A, 18B, the signal magnetic field can efficiently be detected using the magnetoresistance effect without problems such as Barkhausen noise. In addition, use of the electrically insulating antiferromagnetic layers 17A, 17B at ends 15C, 15B of the MR element 15 suppresses leakage current at the ends of the MR element. Consequently, there is an efficient flow of a sense current in the direction perpendicular to the surface 15A of the MR element 15, and the MR element is very sensitive in sensing the signal magnetic field from the magnetic recording medium.

Figure 4A:
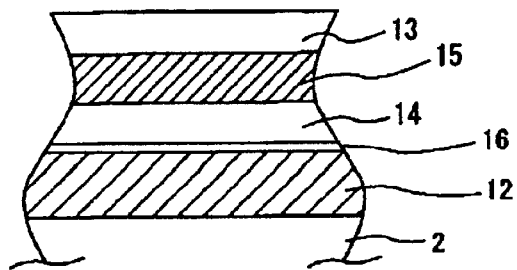
FIGS. 4A–C are cross-sectional views of layers used to form the magnetic head of FIG. 3 during a film fabrication process.
Figure 4B:
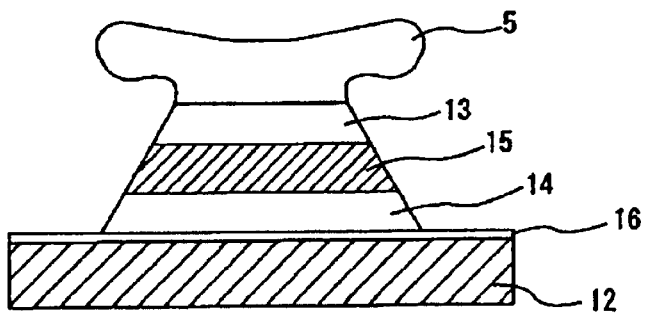
Figure 4C:
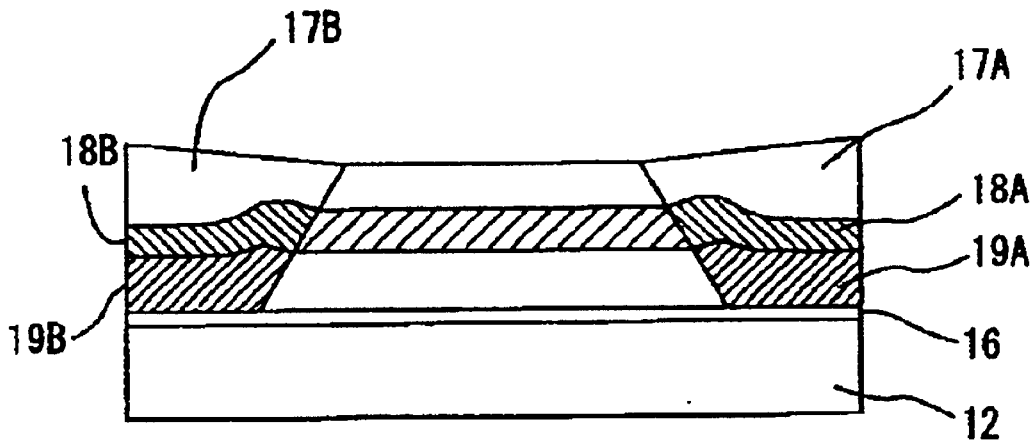

FIGS. 4A–4C illustrate a film fabrication process for manufacturing the magnetic head 10. Referring to FIG. 4A, the film fabrication process includes forming the lower conductive magnetic shield 12 as a FeZrN layer sputtered to about 2 $\mu$m thick on an alumina-tantalum carbide ($Al_2O_3$—TiC) substrate 2. Sputtering a tantalum film to about 5 nm thick on top of the shield 12 then forms the lower gap substrate 16, and sputtering a copper film to about 20 nm thick on top of the lower gap substrate 16 next forms the lower conductive gap material 14.

The materials for the MR element 15, which can be formed either as an SVMR element or a TMR element, are next successively deposited by sputtering one layer on top of another as described above for the TMR and SVMR elements, starting with the lower gap material 14 on the bottom. Then a copper layer about 20 nm thick is formed on the MR element 15 as the upper gap material 13. The above film forming process can be implemented as a continuous or a discontinuous process.

Referring to FIG. 4B, a resist 5 on the order of 1 $\mu$m wide by about 3 $\mu$m high is patterned on the upper gap material 13 and then etched by ion milling until the copper of the lower gap material 14 or the tantalum of the lower gap substrate 16 is detected.

Referring to FIG. 4C, after ion milling the longitudinal bias application layers 17A to 19B are formed on both ends of the MR element 15. The films are successively formed from the bottom up by sputtering. Alumina ($Al_2O_3$) or NiO is used for the insulating layers 19A, 19B; nickel-zinc-ferrite is used for the magnetic layers 18A, 18B; and NiO is used for the antiferromagnetic layers 17A, 17B. The thickness of the layers may be on the order of about 30 nm, 20 nm and 30 nm, respectively. The resist 5 is then lifted off, following which the FeZrN film is formed as the upper shield 11 (shown in FIG. 3) on the MR element 15 to complete the magnetic head 10 of FIG. 3.

Figure 1:
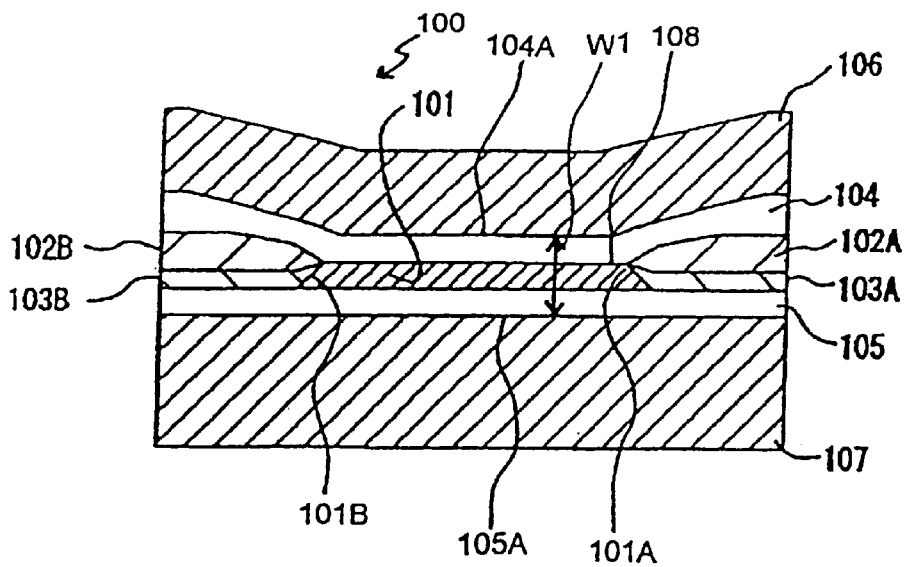
FIG. 1 is a cross-sectional view of a conventional magnetoresistance effect magnetic head as viewed from a recording surface of a magnetic recording medium.
Figure 2:
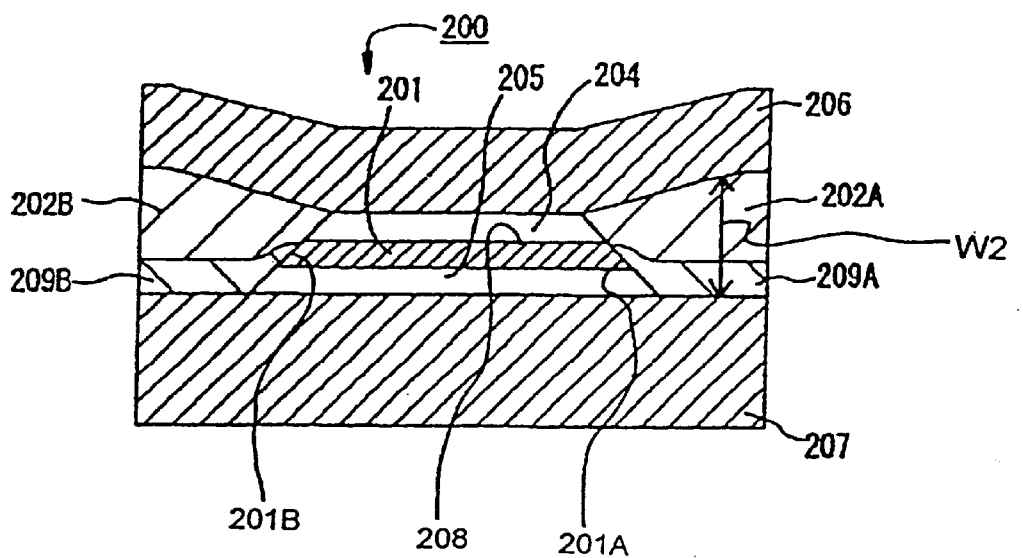
FIG. 2 is a cross-sectional view of the structure of another conventional magnetoresistance effect magnetic head as viewed from a magnetic recording medium.

In the FIG. 3 embodiment of magnetic head 10, the longitudinal bias application layers 21A, 21B, formed on ends 15B, 15C of the MR element 15 perform the same functions as the hard films 209A, 209B (see FIG. 2) of the prior art, which hard films have a higher level of electrical insulation and a desired coercive force, but are difficult to manufacture. The longitudinal bias application layers 21A, 21B, on the other hand, are relatively easier to reliably fabricate and result in improved manufacturing yield of the magnetic head 10.

Figure 5:
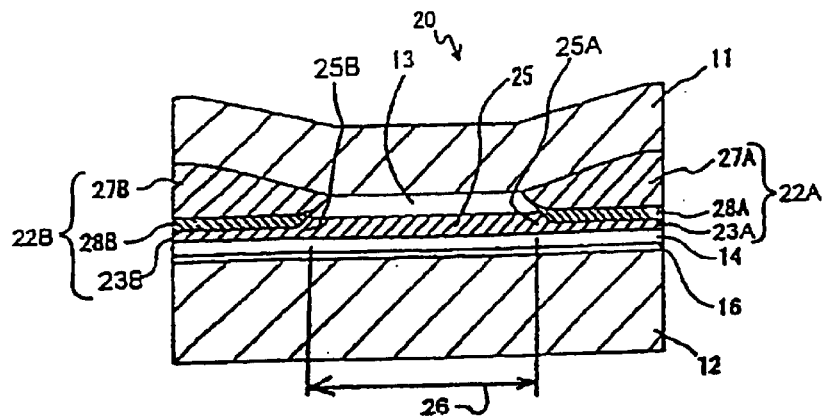
FIG. 5 is a cross-sectional view of a second embodiment of a magnetic head according to the present invention, as viewed from a magnetic recording medium.

FIG. 5 shows a second embodiment of magnetic head 20 in accordance with the present invention, in which like reference numerals as were used in FIG. 3 are used to denote like components. Compared to the magnetic head 10 (see FIG. 3), longitudinal bias application layers or biasing portions 22A, 22B of the magnetic head 20 each have two layers, electrically insulating antiferromagnetic layers 27A, 27B and electrically conductive magnetic layers 28A, 28B in contact with the antiferromagnetic layers 27A, 27B, respectively. The antiferromagnetic layers 27A, 27B can be electrically insulating NiO. The magnetic layers 28A, 28B can be a magnetic material such as electrically conductive Co, NiFe or CoFe.

In the magnetic head 20, an MR element 25 has extensions 23A, 23B at each of its ends 25A, 25B, which extensions 23A, 23B are part of the biasing portions 22A, 22B. The magnetic layers 28A, 28B of the biasing portions 22A, 22B are disposed between the insulating antiferromagnetic layers 27A, 27B and the MR element extensions 23A, 23B, respectively. Thus, at least a portion of the same layer used to form the MR element 25 is present at the lead terminal sides or biasing portions 22A, 22B in the laminated structure, but only the region 26 of the MR element 25, which is interposed between the biasing portions 22A, 22B, functions as the actual MR element 25.

The magnetic head 20 can be manufactured in the same manner as shown in FIGS. 4A–4C to manufacture the magnetic head 10. However, the magnetic head 20 reduces the required amount of etching of the MR element 25 and eliminates the need to etch the lower gap material 14, since the magnetic head 20 preferably only requires etching through a portion of the MR element 25.

Specifically, the MR element 25 can be an SVMR element with films, successively deposited in layers from bottom to top, of NiFe(2)/CoFeB(1)/Cu(3)/CoFeB(2)/PdPtMn(20)/NiFe(2), or a TMR element with films, successively deposited in layers from bottom to top, of NiFe(2)/PdPtMn(20)/Co(2)/$Al_2O_3$(5)/Co(1)/NiFe(2), where again the numbers in parenthesis indicate the thickness of the films in nanometers. For the longitudinal bias application layers or biasing portions 22A, 22B in magnetic head 20, the SVMR element is preferred for suppressing the effect of leakage current.

Both ends 25A, 25B of the MR element 25 are then etched by ion milling until the top NiFe layer of the MR element 25 is detected. The remainder of the biasing portions 22A, 22B are then formed by depositing NiFe magnetic layers 28A, 28B about 10 nm thick and by depositing insulating NiO antiferromagnetic layers 27A, 27B about 40 nm thick.

Because in the second embodiment of magnetic head 20 the magnetic domain of the free magnetic layer in the MR element 25 is controlled in a preferred state by a longitudinal bias magnetic field applied to the MR element 25 from the electrically conductive magnetic layers 28A, 28B that are in contact with the antiferromagnetic layers 27A, 27B, the signal magnetic field can efficiently be detected using the magnetoresistance effect without problems such as Barkhausen noise. In addition, use of the electrically insulating antiferromagnetic layers 27A, 27B at ends 25A, 25B of the MR element 25 suppresses leakage current at the ends 25A, 25B of the MR element. Consequently, there is an efficient flow of sense current in the direction perpendicular to the plane of the MR element 25, and the MR element is highly sensitive in sensing the signal magnetic field from the magnetic recording medium.

Figure 6:
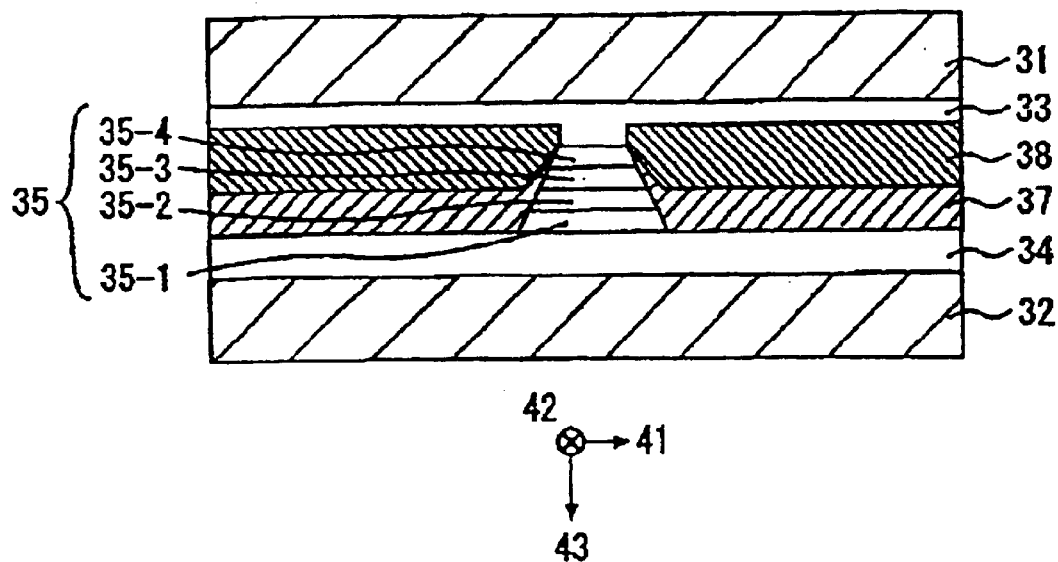
FIG. 6 is a cross-sectional view of a third embodiment of a magnetic head in accordance with the invention, as viewed from a magnetic recording medium.

FIG. 6 shows a third embodiment of magnetic head 30 contemplated by the present invention. In differing from the earlier described magnetic heads 10 and 20, in the magnetic head 30 a longitudinal bias application layer is formed as one layer and a TMR element is used. A metal-oxide hard magnetic film is used for and can form the longitudinal bias application layer in one layer. This structure is similar to, but easier to implement than, the hard film used in the magnetic domain control of a conventional SVMR element.

The magnetic head 30, shown in FIG. 6, has a lower magnetic shield 32 composed of NiFe deposited to a film thickness of about 2 $\mu$m on a substrate (not shown). A layer of a lower electrically conductive gap material 34, which also serves as a lower lead terminal, is formed on top of the lower magnetic shield 32. The lower magnetic shield 32 can also be used as the lower gap material 34.

In the magnetic head 30, the MR element is a TMR element 35 that is sequentially deposited on the lower gap material 34 as laminated thin-film- layers beginning with a bottom layer comprising a free magnetic layer 35-1, followed by an insulating layer or tunnel barrier layer 35-2, then an electrically insulating pinned magnetic layer 35-3 having a fixed direction of magnetism, and finally a top layer comprising an electrically insulating antiferromagnetic layer 354. In the layered TMR element 35, a CoFe(3) or CoFeB(3) layer, or a NiFe(2)/CoFe(1) layer, or a NiFe(2)/CoFeB(1) layer is the free magnetic layer 35-1 on the bottom; an $Al_2O_3$(2) layer is the insulating tunnel barrier layer 35- 2; a CoFe(2) or CoFeB(2) layer is the pinned magnetic layer 35-3 having a fixed magnetic direction; and a PdPtMn(20) layer is formed as the top antiferromagnetic layer 35-4, where the numbers enclosed by parentheses indicate the thickness of each layer in nanometers (nm).

Longitudinal bias application layers 37A, 37B are formed on the conductive lower gap material 34 and sandwich the TMR element 35 on both ends 35A, 35B of the TMR element 35. Superior longitudinal bias application and electrical insulating functions are produced in one layer by using cobalt X ferrite ($CoXFe_2O_4$,) as the longitudinal bias application layers 37A, 37B, where X is a metal-oxide hard magnetic film selected from the group consisting of Cu, Zn, Sn and Ga. The bias application layers 37A, 37B properly control the magnetic domain of the free magnetic layer 35-1 of the TMR element 35 because the bias application layers 37A, 37B provide a required prescribed coercive force (Hc) that, for example, is at least 500 Oe (oersteds).

The third embodiment of magnetic head 30 is manufactured using conventional thin-film forming technology as was used in the manufacture of the first embodiment of magnetic head 10 (FIG. 3) and described in connection with FIGS. 4A–4C. A unidirectional anisotropic magnetic field, in the direction of application of the longitudinal bias magnetic field, is provided by the bias application layers 37A, 37B to the free magnetic layer 35-1 by providing a magnetic field in the direction indicated by the arrow 41 in FIG. 6. In addition, by exchange coupling interaction with the antiferromagnetic layer 35-4, a unidirectional anisotropic magnetic field, in the direction of arrow 42 (perpendicular to the plane of the drawing sheet), is provided to the free magnetic layer 35-1 by the pinned magnetic layer 35-3. As a result of the laminated structure of the TMR element 35, in addition to the orthogonal directions of the magnetic fields in the directions of the arrows 41 and 42, as provided to the free magnetic layer 35-1 by respective longitudinal bias application layers 37A, 37B and the pinned magnetic layer 35-3, the pinned magnetic layer 35-3 achieves a state of fixed magnetic direction that does not respond to an external magnetic field and does not move until the external magnetic field turns in the direction of the arrow 42.

The longitudinal bias application layers 37A, 37B are formed to have a thickness suitable for application of a desired stable longitudinal bias magnetic field to the free magnetic layer 35-1, and $Al_2O_3$ is deposited on the longitudinal bias application layers 37A, 37B to form insulating layers 38A, 38B.

Still referring to FIG. 6, an upper gap material 33 is patterned to a desired shape on the insulating layers 38A, 38B and TMR element 35, and is formed to a length sufficient to extend over the longitudinal bias application layers 37A, 37B. An NiFe layer 3 $\mu$m thick is then deposited on the upper gap material 33 as an upper magnetic shield 31. If desired, the upper magnetic shield 31 can be used as the upper gap material 33. This third embodiment of magnetic head 30 has substantially the same advantages as and functions in substantially the same way as the first embodiment of magnetic head 10.

Figure 7:
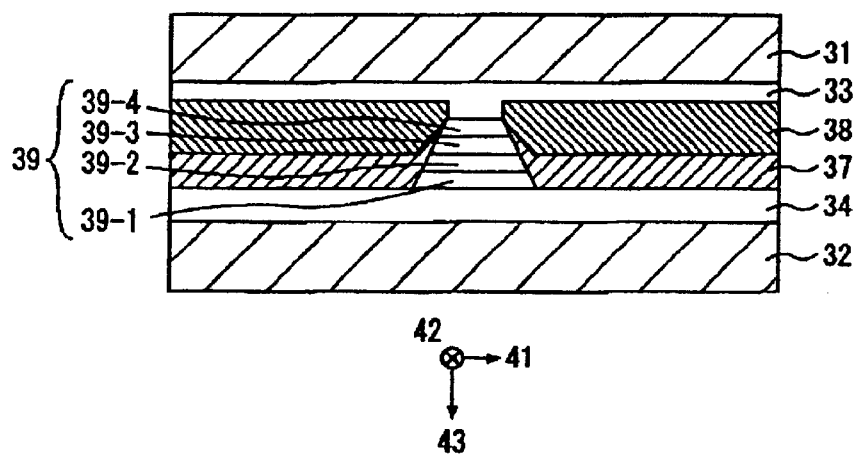
FIG. 7 is a cross-sectional view of a fourth embodiment of a magnetic head of the present invention, as viewed from a magnetic recording medium.

FIG. 7 shows a magnetic head 40 in accordance with a fourth embodiment of the invention. The magnetic head 40 is a modification of the magnetic head 30 (see FIG. 6) and like reference numerals are used to denote like components. In the magnetic head 40, identical elements as are in the magnetic head 30 are used to form the vertical bias application layer 37A, 37B in one layer, and a TMR element 39 is used as an MR element. Unlike the magnetic head 30, however, in fabricating the magnetic head 40 the various thin-film layers of the TMR element 39 are deposited in the reverse order of deposition of the thin-film layers of the TMR element 35 of the magnetic head 30. In particular, the TMR element 39 is composed of laminated thin-film layers deposited on the lower conductive gap material 34, beginning with a bottom layer comprising an electrically insulating antiferromagnetic layer 39-1, followed by a pinned magnetic layer 39-2 having a fixed direction magnetic field, then an insulating layer or tunnel barrier layer 39-3, and finally a free magnetic layer 39-4. The TMR element 39 of the magnetic head 40 obtains the same effects and advantages as does the TMR element 35 of the magnetic head 30.

The third and fourth embodiments of magnetic heads 30 and 40 use TMR elements, which usually are difficult to manufacture. However, these magnetic heads can be implemented using modern hard film technology manufacturing techniques as are widely used to fabricate magnetic heads having SVMR elements, which techniques have a record of success.

In the case of each of the magnetic heads 30 and 40, the magnetic domains of respective free magnetic layers 35-1 and 39-4 in respective TMR elements 35 and 39 are controlled to preferred states by longitudinal bias magnetic fields applied from longitudinal bias application layers 37A, 37B. As a result, in use of the magnetic heads 30 and 40, a signal magnetic field can efficiently be detected using the magnetoresistance effect without problems such as Barkhausen noise, while at the same time the generation of leakage currents at ends 35A, 35B of the TMR elements 35 and 40 is suppressed. Consequently, there is an efficient flow of sense current in the direction of the arrow 43, perpendicular to the longitudinal planes of the TMR elements 35 and 39, and the magnetic heads 30 and 40 are very sensitive in sensing the signal magnetic field from the magnetic recording medium.

While the third and fourth embodiments of magnetic heads 30 and 40 use a TMR element as the MR element, the invention also contemplates use of an SVMR element as the MR element. If an SVMR element were used in a magnetic head, the layered structure of the resulting magnetic head could be similar to that of the first embodiment magnetic head 10, which is formed from multiple deposited thin-film layers including a first magnetic layer, a nonmagnetic layer, a second magnetic layer and an antiferromagnetic layer.

Figure 8:
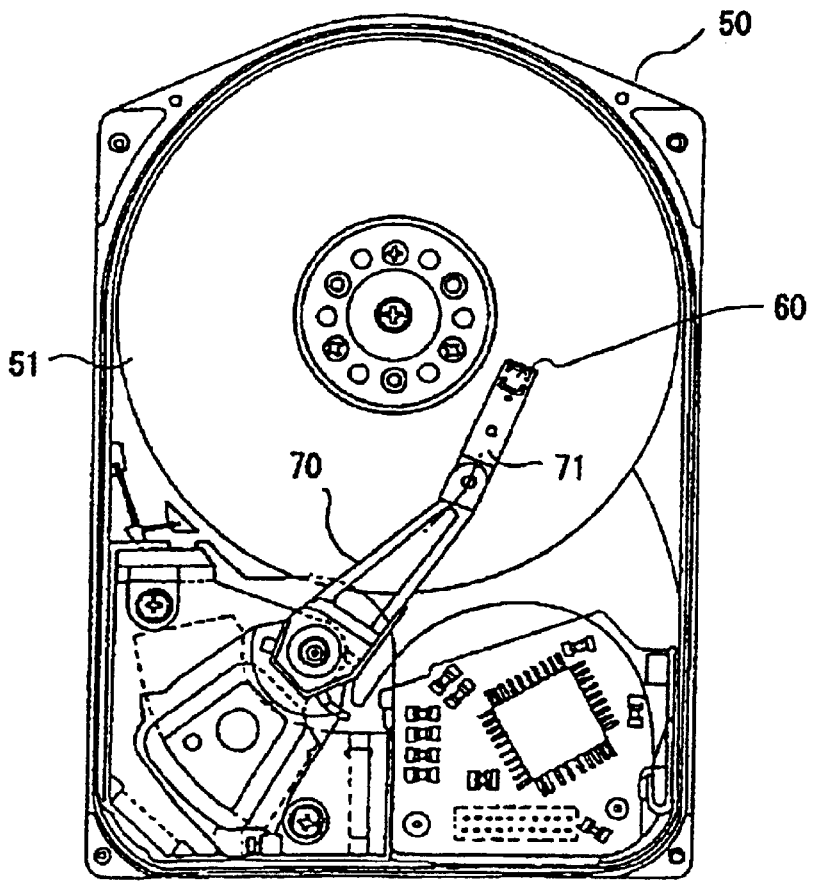
FIG. 8 is a plan view of an uncovered magnetic recording/ reproducing apparatus that uses a magnetic head according to any embodiment of the invention.

Referring now to FIG. 8, a magnetic recording/reproducing apparatus 50, equipped with a composite magnetic head 60, has a magnetic recording medium, such as a hard disk 51, rotatably mounted in the magnetic recording/reproducing apparatus 50. At a specific flying height above the surface of the hard disk 51, magnetic reproduction is performed by the composite magnetic head 60, may be any one of the first through fourth embodiments of magnetic heads 10, 20, 30 and 40. The composite magnetic head 60 is fixed to the front end of a slider 71 at the front end of an arm 70. A two-stage actuator that combines an ordinary actuator and an electromagnetic fine motion actuator accomplishes positioning the composite magnetic head 60.

From the foregoing, it will be appreciated that in the case of the magnetic heads 10 and 20, because the magnetic domains of the free magnetic layers in respective MR elements 15 and 25 are controlled to preferred states by longitudinal bias magnetic fields applied from respective magnetic layers 18A, 18B and 28A, 28B, the signal magnetic field can efficiently be detected using the magnetoresistance effect without problems such as Barkhausen noise. In addition, use of the electrically insulating antiferromagnetic layers 17A, 17B and 27A, 27B, at respective ends 15C, 15B and 25A, 25B of respective MR elements 15 and 25, suppresses leakage current at the ends of the MR elements. Consequently, there is an efficient flow of a sense current in the direction perpendicular to the surfaces of the MR elements 15 and 25 and the MR elements are very sensitive in sensing the signal magnetic field from magnetic recording medium.

It will also be appreciated that in the case of the magnetic heads 30 and 40, because the magnetic domains of respective free magnetic layers 35-1 and 39-4 in respective TMR elements 35 and 39 are controlled to preferred states by orthogonal magnetic fields comprising longitudinal bias magnetic fields and unidirectional anisotropic magnetic fields applied to respective free magnetic layers 35-1 and 39-4 from respective longitudinal bias application layers 37A, 37B and from respective pinned magnetic layers 35-3 and 39-2, a signal magnetic field can efficiently be detected using the magnetoresistance effect without problems such as Barkhausen noise. At the same time, leakage currents at ends 35A, 35B of the TMR elements 35 and 40 are suppressed by the insulating layers 38A, 38B. Consequently, there is an efficient flow of a sense current in the direction perpendicular to the longitudinal plane of the TMR elements 35 and 39, and the TMR elements 35 and 39 are very sensitive in sensing the signal magnetic field from the magnetic recording medium.

In addition, although the magnetic heads 10, 20, 30 and 40 are designed to reproduce the signal magnetic field from the magnetic recording medium with high sensitivity, it will be appreciated that any of the magnetic heads 10, 20, 30 or 40 of the present invention can be combined with an inductive thin-film head to form a recording/reproducing head or composite head.

While embodiments of the invention have been described in detail, various embodiments and other modifications thereof may be devised by one skilled in the art without departing from the spirit and scope of the invention, as defined by the appended claims.

What is claimed is:

1. A magnetoresistance effect magnetic head, comprising:
   a magnetoresistance effect element having a first end and a second end; and
   a biasing portion at said first and second ends of said magnetoresistance effect element for applying a longitudinal bias magnetic field to said magnetoresistance effect element, said biasing portion including an intermediate layer disposed between a first layer and a second layer,
   wherein said first layer is an antiferromagnetic layer, said second layer is formed from one of $Al_2O_3$ and NiO, and said second layer has a thickness of approximately 30 nm.

2. A magnetoresistance effect magnetic head according to claim 1, further comprising:
   electrically conductive upper and lower gap materials disposed in contact with a top and a bottom, respectively, of said magnetoresistance effect element; and
   electrically conductive upper and lower shields disposed in contact with said upper and said lower gap materials, respectively.

3. A magnetoresistance effect magnetic head according to claim 1, wherein said first layer is a single layer of NiO.

4. A magnetoresistance effect magnetic head according to claim 1, wherein said antiferromagnetic layer has a thickness on the order of about 30 nm.

5. A magnetoresistance effect magnetic head according to claim 1, wherein said intermediate layer is an electrically conductive layer of one of NiFe, Co and CoFe.

6. A magnetoresistance effect magnetic head according to claim 1, wherein said intermediate layer is a layer of one cobalt ferrite, barium ferrite, cobalt-platinum-silicon oxide and ferrite metals.

7. A magnetoresistance effect magnetic head according to claim 1, wherein said second layer is formed by a portion of said magnetoresistance effect element, which extends from said first and second ends of said magnetoresistance effect element.

8. A magnetoresistance effect magnetic head according to claim 7, wherein said magnetoresistance effect element is an SVMR element having successive films of NiFe, CoFeB, Cu, CoFeB and PdPtMn.

9. A magnetoresistance effect magnetic head according to claim 7, wherein said magnetoresistance effect element is a TMR element having successive films of NiFe, PdPtMn, Co, $Al_2O_3$ and Co.

10. A magnetoresistance effect magnetic head comprising:
   a magnetoresistance effect element having a first end and a second end; and
   a biasing portion at said first and second ends of said magnetoresistance effect element for applying a longitudinal bias magnetic field to said magnetoresistance effect element, said biasing portion including an intermediate layer disposed between a first layer and a second layer;
   wherein said intermediate layer is a soft magnetic material of nickel-zinc- ferrite.

11. A magnetoresistance effect magnetic head, comprising:
   a magnetoresistance effect element having a first end and a second end; and
   a biasing portion at said first and second ends of said magnetoresistance effect element for applying a longitudinal bias magnetic field to said magnetoresistance effect element, said biasing portion including an intermediate layer disposed between a first layer and a second layer,
   electrically conductive upper and lower gap materials disposed in contact with a top and a bottom, respectively, of said magnetoresistance effect element;
   electrically conductive upper and lower shields disposed in contact with said upper and said lower gap materials, respectively, and
   a substrate film disposed between said lower gap material and said lower shield, and between said second layer and said lower shield.

12. A magnetoresistance effect magnetic head according to claim 11, wherein said substrate film is formed from tantalum and has a thickness of approximately 5 nm.

13. A magnetoresistance effect magnetic head, comprising:
   a magnetoresistance effect element having first and second ends and a top and bottom;
   upper and lower conductive gap materials in contact with said top and bottom, respectively, of said magnetoresistance element;
   upper and lower conductive shielding material in contact with said upper and lower gap material, respectively, on sides of said upper and lower gap material opposite from said magnetoresistance element; and
   an insulating biasing portion at said first and second ends of said magnetoresistance effect element for applying a longitudinal bias magnetic field to said magnetoresistance effect element and for suppressing current flow at said first and second ends of said magnetoresistance element;
   wherein said biasing portion includes a first layer comprising an insulating longitudinal bias application layer and a second layer comprising an insulating layer in contact with said longitudinal bias application layer; and
   said first layer is formed from a metal-oxide hard magnetic film.

14. A magnetoresistance effect magnetic head according to claim 13, wherein said upper conductive gap material and said upper conductive shielding material are one and the same, and said lower conductive gap material and said lower conductive shielding material are one and the same.

15. A magnetoresistance effect magnetic head according to claim 13, wherein said upper and lower shielding materials are each a single layer of NiFe.

16. A magnetoresistance effect magnetic head according to claim 15, wherein said upper and lower shielding materials have thickness on the order of abut 3 $\mu$m and 2 $\mu$m, respectively.

17. A magnetoresistance effect magnetic head according to claim 13, wherein said second layer is formed from $Al_2O_3$.

18. A magnetoresistance effect magnetic head according to claim 13, wherein said first layer is formed from $CoXFe_2O_4$, where X is a metal-oxide hard magnetic material selected from the group consisting of Cu, Zn, Sn and Ga.

19. A magnetoresistance effect magnetic head according to claim 13, wherein said first layer is formed from a magnetic material to provide a coercive force of at least 500 Oe (oersteds).

20. A magnetoresistance effect magnetic head according to claim 13, wherein said magnetoresistance effect element is a TMR element having, from bottom to top, successive films of a free magnetic layer, an insulating layer or tunnel barrier layer, an electrically insulating pinned magnetic layer having a fixed direction magnetic field, and an insulating antiferromagnetic layer.

21. A magnetoresistance effect magnetic head according to claim 20, wherein said free magnetic layer is formed from one of CoFe, CoFeB, NiFe/CoFe aid NiFe/CoFeB.

22. A magnetoresistance effect magnetic head according to claim 20, wherein said insulating layer or tunnel barrier layer is formed from $Al_2O_3$.

23. A magnetoresistance effect magnetic head according to claim 20, wherein said electrically insulating pinned magnetic layer is formed from one of CoFe and CoFeB.

24. A magnetoresistance effect magnetic head according to claim 20, wherein said insulating antiferromagnetic layer is formed from PdPtMn.

25. A magnetoresistance effect magnetic head according to claim 13, wherein said magnetoresistance element is a TMR element having, from bottom to top, successive films of an insulating antiferromagnetic layer, an electrically insulating pinned magnetic layer having a fixed direction of magnetism, an insulating layer or tunnel barrier layer, and a free magnetic layer.

26. A magnetoresistance effect magnetic head according to claim 25, wherein said insulating antiferromagnetic layer is formed from PdPtMn.

27. A magnetoresistance effect magnetic head according to claim 25, wherein said insulating pinned magnetic layer is formed from one of CoFe and CoFeB.

28. A magnetoresistance effect magnetic head according to claim 25, wherein said insulating layer or tunnel barrier layer is formed from $AL_2O_3$.

29. A magnetoresistance effect magnetic head according to claim 25, wherein said free magnetic layer is formed from one of CoFe, CoFeB, NiFe/CoFe and NiFe/CoFeB.

30. A magnetoresistance effect magnetic head, comprising:
   a magnetoresistance effect element having first and second ends and a top and bottom;
   upper and lower conductive gap materials in contact with said top and bottom, respectively, of said magnetoresistance element;
   upper and lower conductive shielding material in contact with said upper and lower gap material, respectively, on sides of said upper and lower gap material opposite from said magnetoresistance element; and
   an insulating biasing portion at said first and second ends of said magnetoresistance effect element for applying a longitudinal bias magnetic field to said magnetoresistance effect element and for suppressing current flow at said first and second ends of said magnetoresistance element; wherein said magnetoresistance element is an SVMR element having successive films of NiFe, CoFeB, Cu, CoFeB and PdPtMn.

31. A magnetic recording/reproducing apparatus having at least one magnetic recording medium rotatably mounted therein, comprising:

an actuator pivotally mounted in said magnetic recording/reproducing apparatus;

an arm having a proximate end and a distal end, said proximate end being connected to said actuator;

a suspension having a base end and a mounting portion, said base end being connected to said distal end of said arm;

a slider attached to said mounting portion; and a magnetoresistance effect element attached to said slider, said magnetoresistance effect element having first and second ends and a top and a bottom and including, upper and lower conductive gap materials in contact with said top and bottom, respectively, of said magnetoresistance element;

upper and lower conductive shielding material in contact with said upper and lower gap material, respectively, on sides of said upper and lower gap material opposite from said magnetoresistance element; and an insulating biasing portion at said first and second ends of said magnetoresistance effect element for applying a longitudinal bias magnetic field to said magnetoresistance effect element and for suppressing current flow at said first and second ends of said magnetoresistance element;

wherein said biasing portion includes a first layer comprising an insulating longitudinal bias application layer and a second layer comprising an insulating layer in contact with said longitudinal bias application layer, and said first layer is formed from a metal-oxide hard magnetic film.

32. A magnet recording/reproducing apparatus according to claim 31, wherein said second layer is formed from $Al_2O_3$.

33. A magnet recording/reproducing apparatus according to claim 31, wherein said first layer is formed from $CoXFe_2O_4$, where X is a metal-oxide hard magnetic material selected from the group consisting of Cu, Zn, Sn and Ga.

34. A magnet recording/reproducing apparatus according to claim 31, wherein said first layer is formed from a magnetic material to provide a coercive force of at least 500 Oe (oersteds).

35. A magnet recording/reproducing apparatus according to claim 31, wherein said magnetoresistance effect element is a TMR element having, from bottom to top, successive films of a free magnetic layer, an insulating layer or tunnel barrier layer, an electrically insulating pinned magnetic layer having a fixed direction magnetic field, and an insulating antiferromagnetic layer.

36. A magnet recording/reproducing apparatus according to claim 31, wherein said magnetoresistance element is a TMR element having, from bottom to top, successive films of an insulating antiferromagnetic layer, and electrically insulating pinned magnetic layer having a fixed direction of magnetism, an insulating layer or tunnel barrier layer, and a free magnetic layer.

37. A magnetic recording/reproducing apparatus having at least one magnetic recording medium rotatably mounted therein, comprising:

an actuator pivotally mounted in said magnetic recording/reproducing apparatus;

an arm having a proximate end and a distal end, said proximate end being connected to said actuator;

a suspension having a base end and a mounting portion, said base end being connected to said distal end of said arm;

a slider attached to said mounting portion; and a magnetoresistance effect element attached to said slider, said magnetoresistance effect element having first and second ends and a top and a bottom and including, upper and lower conductive gap materials in contact with said top and bottom, respectively, of said magnetoresistance element;

upper and lower conductive shielding material in contact with said upper and lower gap material, respectively, on sides of said upper and lower gap material opposite from said magnetoresistance element; and an insulating biasing portion at said first and second ends of said magnetoresistance effect element for a in a longitudinal bias magnetic field to said magnetoresistance effect element and for suppressing current flow at said first and second ends of said magnetoresistance element;

wherein said magnetoresistance element is an SVMR element having successive films of NiFe, CoFeB, Cu, CoFeB and PdPtMn.

38. A magnetoresistance effect magnetic head, comprising:

a magnetoresistance effect element having first and second ends and a top and bottom;

upper and lower conductive gap materials in contact with said top and bottom, respectively, of said magnetoresistance element;

upper and lower conductive shielding material in contact with said upper and lower gap material, respectively, on sides of said upper and lower gap material opposite from said magnetoresistance element; and an insulating biasing portion at said first and second ends of said magnetoresistance effect element for applying a longitudinal bias magnetic field to said magnetoresistance effect element and for suppressing current flow at said first and second ends of said magnetoresistance element;

wherein said insulating biasing portion includes an insulating ferromagnetic layer and a soft magnetic layer in contact with said antiferromagnetic layer.

39. A magnetoresistance effect magnetic head, comprising:

a magnetoresistance effect element having first and second ends and a top and bottom;

upper and lower conductive gap materials in contact with said top and bottom, respectively, of said magnetoresistance element;

upper and lower conductive shielding material in contact with said upper and lower gap material, respectively, on sides of said upper and lower gap material opposite from said magnetoresistance element; and an insulating biasing portion at said first and second ends of said magnetoresistance effect element for applying a longitudinal bias magnetic field to said magnetoresistance effect element and for suppressing current flow at said first and second ends of said magnetoresistance element;

wherein said biasing portion includes an insulating hard magnetic layer.

* * * * *

UNITED STATES PATENT AND TRADEMARK OFFICE
CERTIFICATE OF CORRECTION

PATENT NO. : 6,721,147 B2  
DATED : April 13, 2004  
INVENTOR(S) : Kenichi Aoshima Page 1 of 1

It is certified that error appears in the above-identified patent and that said Letters Patent is hereby corrected as shown below:

Column 14,
Line 18, delete "a in" and insert -- applying -- therefore.

Signed and Sealed this

Twenty-first Day of December, 2004

JON W. DUDAS
*Director of the United States Patent and Trademark Office*